(12) United States Patent
Márquez López et al.

(10) Patent No.: US 8,262,024 B2
(45) Date of Patent: Sep. 11, 2012

(54) AIRCRAFT FRAMES

(76) Inventors: Ignacio José Márquez López, Madrid (ES); José Cuenca Rincón, Madrid (ES); Francisco Javier Chamorro Alonso, Madrid (ES); Pedro Nogueroles Viñes, Madrid (ES)

( * ) Notice: Subject to any disclaimer, the term of this patent is extended or adjusted under 35 U.S.C. 154(b) by 526 days.

(21) Appl. No.: 12/569,918

(22) Filed: Sep. 30, 2009

(65) Prior Publication Data
US 2010/0327113 A1 Dec. 30, 2010

(30) Foreign Application Priority Data
Jun. 29, 2009 (ES) .................................. 200930371

(51) Int. Cl.
*B64C 1/00* (2006.01)
(52) U.S. Cl. ...................... 244/119; 244/131; 244/123.13
(58) Field of Classification Search .................. 244/119, 244/123.1, 131
See application file for complete search history.

(56) References Cited

U.S. PATENT DOCUMENTS

| | | | |
|---|---|---|---|
| 3,071,217 A * | 1/1963 | Gould ............................ | 52/403.1 |
| 4,411,380 A * | 10/1983 | McWithey et al. ............. | 228/181 |
| 5,242,523 A * | 9/1993 | Willden et al. ................ | 156/285 |
| 7,074,474 B2 * | 7/2006 | Toi et al. ........................ | 428/102 |
| 7,635,106 B2 * | 12/2009 | Pham et al. .................... | 244/131 |
| 7,716,835 B2 * | 5/2010 | Johnson et al. ............... | 29/897.2 |
| 7,963,477 B2 * | 6/2011 | Soula et al. .................... | 244/1 A |
| 8,079,549 B2 * | 12/2011 | Gouvea .......................... | 244/119 |
| 2009/0121081 A1 * | 5/2009 | Karem ........................... | 244/119 |
| 2010/0133380 A1 * | 6/2010 | Roebroeks et al. ............ | 244/119 |
| 2010/0308165 A1 * | 12/2010 | Markowski et al. ........... | 244/119 |
| 2012/0056037 A1 * | 3/2012 | Dolzinski et al. .............. | 244/119 |
| 2012/0061512 A1 * | 3/2012 | Stulc et al. .................... | 244/118.5 |

FOREIGN PATENT DOCUMENTS
EP         48191 A1 *  3/1982

* cited by examiner

Primary Examiner — Christopher P Ellis
(74) Attorney, Agent, or Firm — Ladas & Parry LLP

(57) ABSTRACT

The invention relates to a reinforcing frame (1) of the fuselage (2) of an aircraft, said fuselage (2) comprising a skin (3) and stringers (20), the mentioned frame (1) comprising a structural member (4) and a closed, internally hollow honeycomb member (5), the structural member (4) comprising a lower base (6) which is arranged on the inner face of the skin (3) of the fuselage (2), and through which the stringers (20) connecting the frames (1) to the rest of the structure of the fuselage (2) pass, and upper reinforcing members (7) on which the mentioned honeycomb members (5) are arranged, such that the honeycomb members (5) increase the inertia and the stiffness of the frame (1) without adding weight thereto, the frame (1) having high stiffness in the transverse direction, in addition to being intrinsically stable to local buckling.

12 Claims, 3 Drawing Sheets

AIRCRAFT FRAMES

FIELD OF THE INVENTION

The present invention relates to the design of reinforcing frames of the fuselage of an aircraft, said frames particularly being manufactured in composite material.

BACKGROUND OF THE INVENTION

Throughout the history of aviation, the materials used have considerably evolved in order to be able to increase their resistance, while at the same time reducing their weight. A specific material which complies with these demands is carbon fiber composite material. As a result of its benefits, the use of composite materials currently reaches up to 50% of the structure of the aircraft.

The fuselage is the main assembly of an aircraft, given that the remaining members forming the aircraft are directly or indirectly connected thereto. The shape of the fuselage varies with the main purpose the aircraft is going to have, hence there are several types of fuselage, such as the truss-type, the monocoque-type, or semi monocoque-type, the latter being the most widely used fuselage type today.

The fuselage of an aircraft comprises members in the form of perpendicular trussing with respect to the longitudinal axis of the aircraft, called frames, which are responsible for giving shape and stiffness to the structure of the fuselage, these frames being placed at intervals in the inner part of the tube of the fuselage of the aircraft. In addition to the frames, the fuselage comprises other reinforcing members, such as the stringers, generally omega-shaped or the like, to optimize the distribution of loads and stiffness. The stringers are placed by connecting the frames along the longitudinal axis of the fuselage, their presence allowing the thinning of the skin of the structure of the fuselage, thus lightening the weight of the assembly of the structure. The stringers in turn perform a secondary reinforcing function, the members being what give shape to the fuselage and forming the main points of connection of the skin. Therefore, the entire framework of frames, stringers and skin are connected to form a complete and stiff structure.

In some areas of the fuselage, it is necessary to make openings, such as passenger doors, cargo doors or windows. In these cases, since the structure of the aircraft is weakened, it is necessary to locally reinforce the area of the opening with other members such as door frames. These members are generically referred to as reinforcing frames.

The fuselage of the aircraft is subjected to all types of structural loads, in addition to also having to withstand the cabin pressurization loads. Overall, the fuselage is subjected to bending, torsional and inertial loads, the pressurization loads mostly being withstood by the skin, the stringers withstanding the bending that the fuselage experiences in the longitudinal direction. In addition, the frames uniformly distribute the loads in each of the segments into which the inner section of the structure of the fuselage is divided, the skin, the stringers and the frames, acting as a single beam, ultimately supporting the torsional and inertial loads.

It would therefore be desirable for current aircraft frames, mainly in the case of heavily loaded structures or frames, to be designed by means of a design providing high stiffness and inertia to the structure, while at the same time not adding weight thereto.

For the case of heavily loaded structures, the profiles forming the frames of the aircraft must comprise strengthening ridges or stiffeners increasing the stiffness of the frames. However, these members increase the total weight of the structure, while at the same time having the drawbacks of eliminating the cleared or useful space inside the structure of the fuselage, this space being very important for purposes of cargo or placing equipment inside large aircraft, while at the same time enormously encumbering the passage of the stringers through the frames, in order to thus connect the same along the longitudinal axis of the fuselage.

The present invention offers a solution to the aforementioned problems.

SUMMARY OF THE INVENTION

The invention therefore relates to the design of reinforcing frames of the fuselage of an aircraft, said frames particularly being manufactured in composite material, said frames comprising a structural member and a closed, internally hollow honeycomb member, the mentioned structural member in turn comprising a lower base which is arranged on the inner face of the skin of the fuselage of the aircraft, and through which the stringers connecting the frames to the rest of the structure of the fuselage pass, and upper reinforcing members on which the closed honeycomb members are arranged. The structural members of the frames of the invention are preferably an H beam, such that the lower base and the upper reinforcement are connected through a web. The closed honeycomb member provides the advantage of increasing the inertia and, accordingly, the stiffness of the frame, because it separates the mass contributing to the calculation of the moment of inertia of the profile of the frame from the center of gravity thereof, while at the same time since said honeycomb member is hollow, it does not add considerable weight to the structure.

Therefore, the final shape obtained by means of the design of the frame of the invention is similar to an omega shape, which provides the structure with the advantage of an increase of stiffness without increasing the weight. Structures of this type have not been used until now in aircraft frames.

The frames of the invention are not used for the connection with the reinforcing members of the necessary reinforcing frames around passenger or cargo doors, or around windows of the aircraft.

The structural member of the frame object of the invention is manufactured in composite material by means of a resin transfer moulding (RTM) process, by means of which catalyzed resin is injected into a die mould in which a reinforcement has been previously arranged, both the mould and the resin being able to be heated or not. The closed honeycomb member is also manufactured in composite material, being able to be connected in the fresh state to the upper reinforcing members of the structural member of the frame. Therefore, since the structural member is flexible, it is able to be adapted and adjusted in a simple manner to the inner face of the skin of the fuselage on which the frame will be arranged, the closed honeycomb member in the fresh state subsequently being able to be placed on top of the previous structural member, while at the same time the latter is arranged on the skin.

Other features and advantages of the present invention will be inferred from the following detailed description of an illustrative embodiment of its object in relation to the attached drawings.

DETAILED DESCRIPTION OF THE INVENTION

Figure 1:
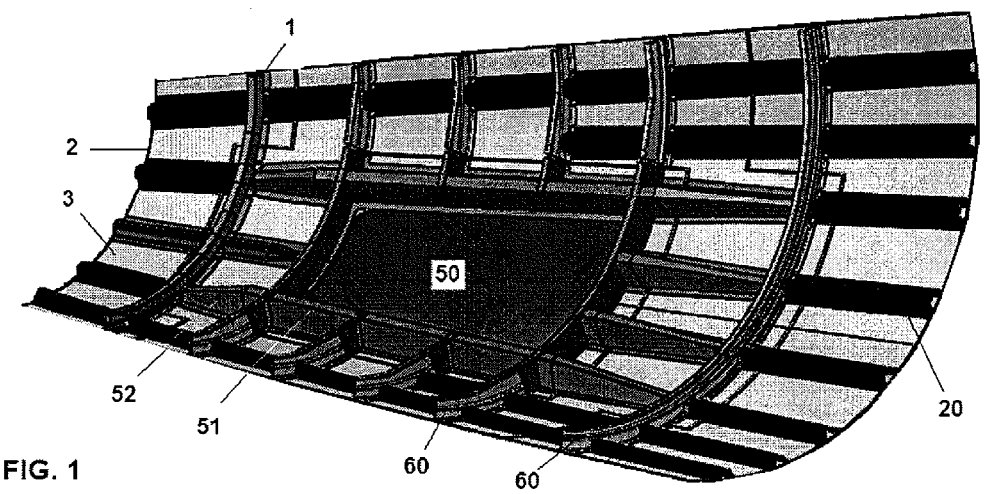
FIG. 1 shows a sectional diagram of the fuselage of an aircraft comprising a reinforcing frame, stringers, standard frames and a reinforcing frame of the fuselage according to the present invention.
Figure 2:
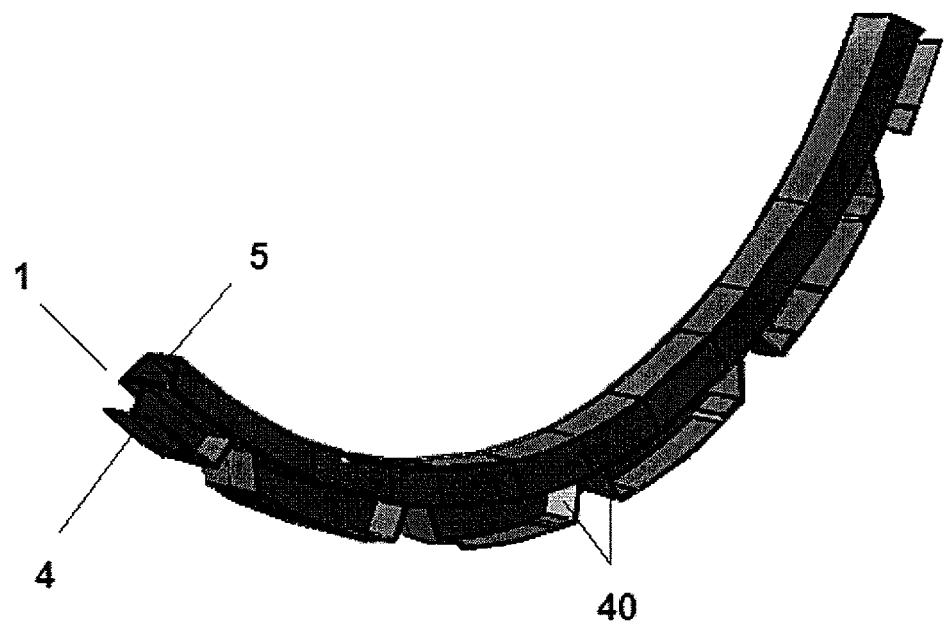
FIG. 2 shows a detail of the members making up a reinforcing frame of the fuselage of an aircraft according to the present invention.

The invention relates to the design of a reinforcing frame 1 of the fuselage 2 of an aircraft, said frame 1 preferably being manufactured in composite material, although this frame 1 can also be manufactured in metal. The frame 1 comprises a structural member 4 and a closed, internally hollow honeycomb member 5, the geometry of which can be variable. The structural member 4 comprises a lower base 6 which is arranged on the inner face of the skin 3 of the fuselage 2 of the aircraft, and through which the stringers 20 connecting the frames 1 to the rest of the structure of the fuselage 2 pass, and upper reinforcing members 7 on which the honeycomb members 5 are arranged. The structural members 4 of the frames 1 are preferably an H beam, such that the lower base 6 and the upper reinforcing member 7 are connected through a web 8. Although this has been described for the H-profile, the structural member 4 of the frame 1 can have another section shape different from it, a Z shape for example, provided that it comprises a lower base 6 which is arranged on the inner face of the skin 3 and an upper reinforcing member 7 on which the honeycomb member 5 can be arranged.

Figure 3:
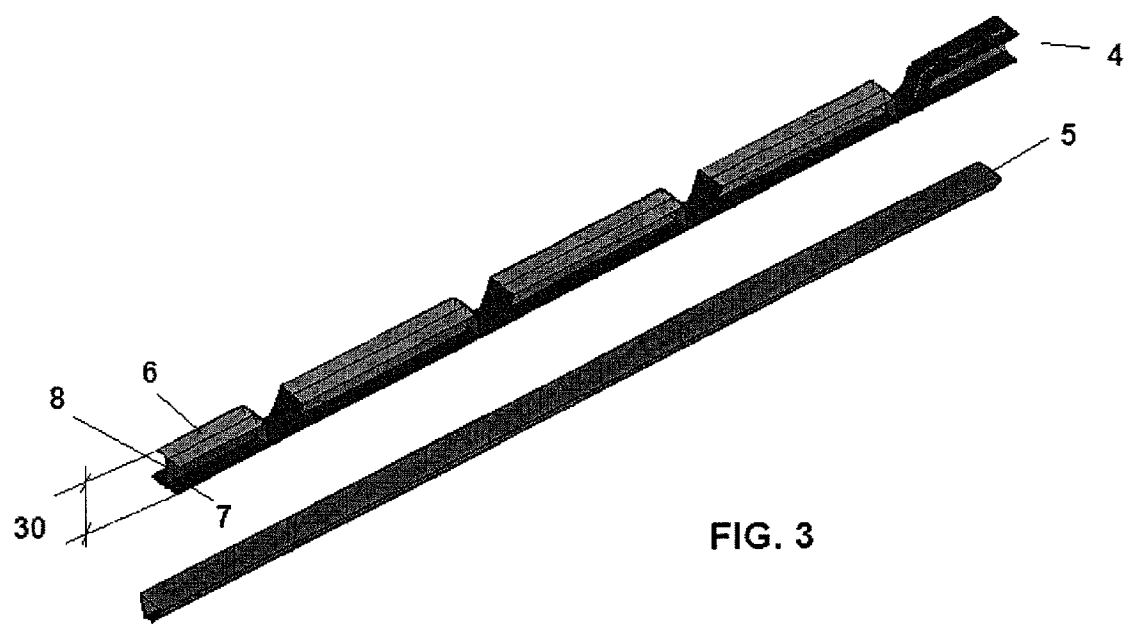
FIG. 3 shows the development of the members making up a reinforcing frame of the fuselage of an aircraft according to the present invention.

The honeycomb member 5 provides the advantage of increasing the inertia and, accordingly, the stiffness of the frame 1 of the invention, while at the same time it does not add considerable weight to the structure of said frame 1. Thus, the final shape obtained by means of the design of the frame 1 of the invention is similar to an omega shape, which provides the structure with the advantage of an increase of stiffness without increasing the weight. In addition to these indicated advantages, the frame 1 of the invention is stiffer than conventional frames in the direction transverse to the mentioned frame 1, in addition to being intrinsically stable against local buckling. Furthermore, the height 30 of the frame 1 of the invention (see FIG. 3) is less than that of a conventional frame for the same load requirement, leaving a greater cleared or useful space inside the fuselage 2 of the aircraft. These advantages are even more considerable the greater the load the frame 1 bears (for example, in the case of main frames of the aircraft wing): in cases of a large load on the frame 1, conventional frames must comprising strengthening ridges or stiffeners increasing the stiffness of said frames. The frame 1 of the invention provides greater cleared space inside the fuselage 2, as a greater moment of inertia of the structure is obtained without adding web or height in the structural member 4: the honeycomb member 5 stabilizes and reinforces the frame 1, preventing the necessary use of strengthening ridges or stiffeners of the structures of conventional frames.

Figure 4:
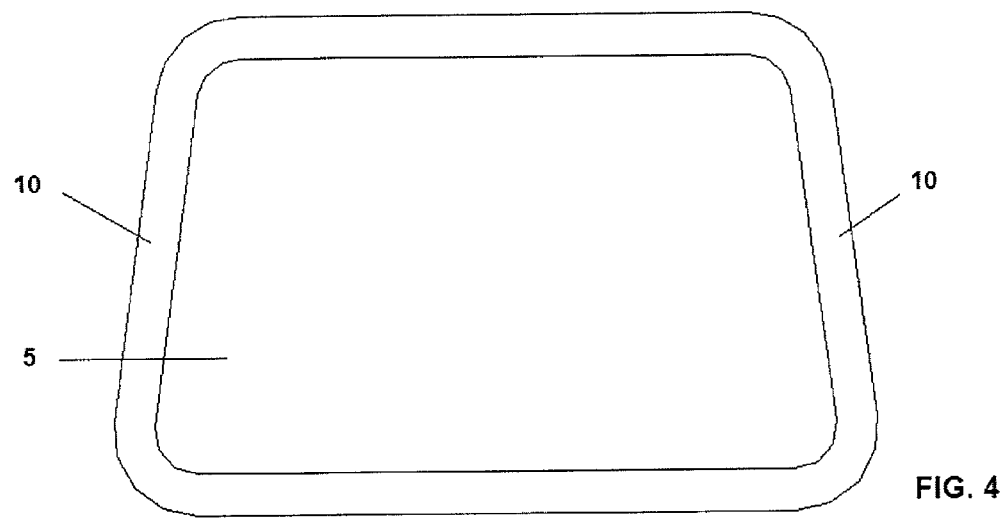
FIG. 4 shows a sectional detail of the closed honeycomb members of a reinforcing frame of the fuselage of an aircraft according to the present invention.
Figure 5:
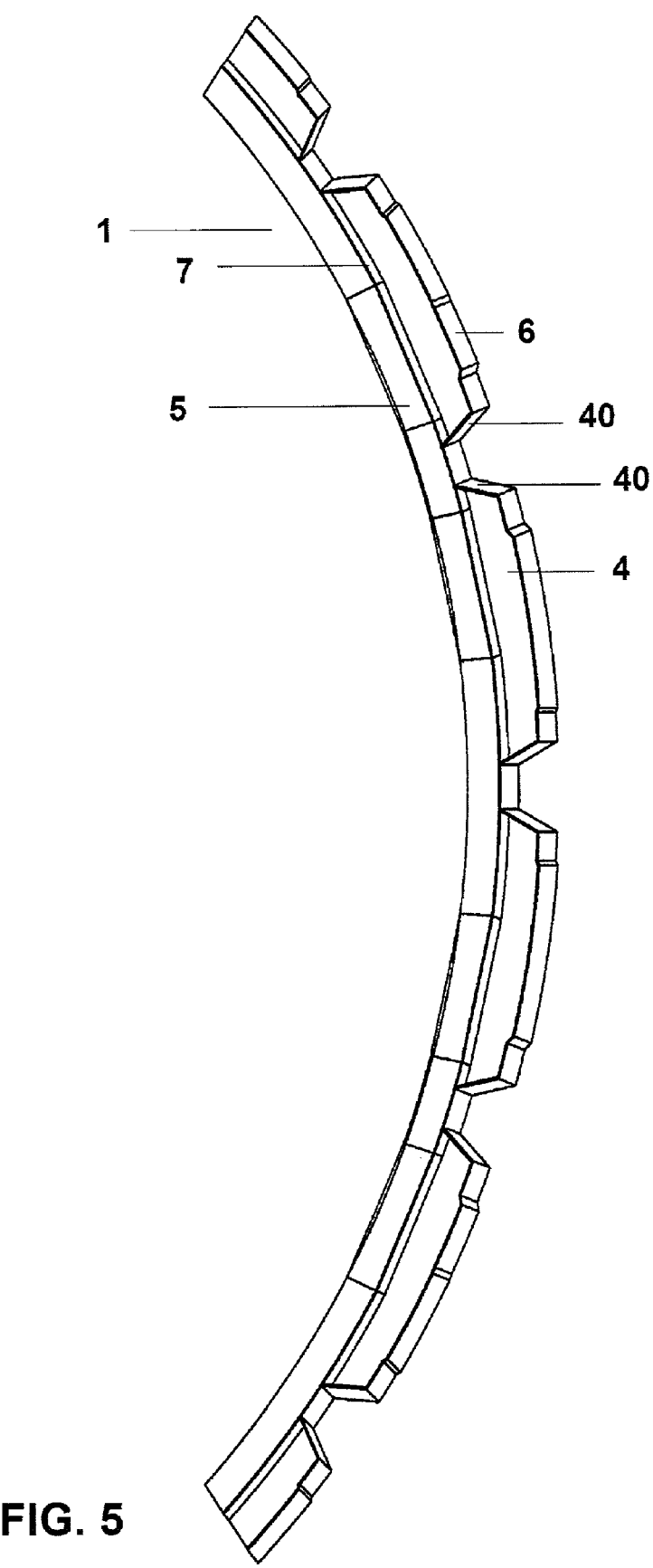
FIG. 5 shows a detail view of the reinforcing frame of the fuselage of an aircraft according to the present invention.

Another advantage of the invention is based on the fact that in the frame 1 it is possible to vary and modify the reinforcements of the honeycomb member 5 in the side walls 10 (FIG. 4) thereof according to the calculation needs, depending on how much the stiffness of the frame 1 needs to be increased while at the same time the weight thereof is maintained, or said weight is not increased considerably. Thus, the walls 10 of the honeycomb member 5 can comprise carbon fiber reinforcement layers, which increase the stiffness of the frame 1. Another advantage of the frame 1 of the invention is that the passage of the stringers 20 through said frames is carried out in an easy manner, through the walls 40 of the structural members 4. Furthermore, said stringers 20 are fixed by means of gluing to the mentioned walls 40 of the structural members 4, the use of rivets, which would increase the cost and complicate the process of connecting them, while at the same time adding weight thereto, not being necessary. On the other hand, the assembly of the frame 1 through the lower base 6 of the structural member 4 is facilitated because there is an access with an open part to the inner face of the skin 3 (through the walls 40) on which said frame 1 will be fixed.

The structural member 4 of the frame 1 is manufactured in composite material by means of a resin transfer moulding (RTM) process. The closed honeycomb member 5 is likewise manufactured in composite material, being able to be connected in the fresh state to the upper reinforcing members 7 of the structural member 4 of the frame 1. Therefore, since the frame 1 of the invention has flexibility as a result of the fact that the honeycomb member 5 can be arranged in a non-stiffened fresh state on the structural member 4, the structural member 4 is able to be adapted and adjusted in a simple manner to the inner face of the skin 3 of the fuselage 2 on which the frame 1 will be arranged, the closed honeycomb member 5 in the fresh state subsequently being able to be placed on top of the previous structural member 4, while at the same time said structural member 4 is arranged on the inner face of the skin 3, the entire assembly, comprising the structural member 4, the honeycomb member 5 and the skin 3, subsequently being cured. In traditional frames, it is very difficult to adjust the member of the profile of the frame, because it is usually a non-flexible member, since this member is cured and stiffened for the case of said traditional frames. In the case of the frame 1 of the invention, since the honeycomb member 5 is in the non-stiffened fresh state, said honeycomb member 5 allows the structural member 4 to be coupled better by itself to the inner face of the skin 3. In the event that both the structural member 4 and the honeycomb member 5 are cured, the same drawbacks existing in conventional frames would occur, in which conventional frames there is a phenomenon referred to as spring-back or deformation contrary to the arrangement or placement of the frame member, making the subsequent assembly of the remaining members of the structure of the aircraft very complicated.

The structural member 4 of the frame 1, which in principle does not comprise the honeycomb member 5, thus has greater flexibility (i.e., less stiffness or moment of inertia) than traditional frames which are made in a single part, already cured because, as previously discussed, it is the honeycomb member 5 which provides greater stiffness or inertia to the structure of the frame 1 according to the invention. It is thus possible to more easily arrange, as a result of its flexibility, the structural member 4 on the inner skin 3 of the fuselage 2 of the aircraft. This inner skin 3 can have shapes, on many occasions, with double curvature, whereby it is very complex to couple an already cured and rather inflexible frame structure thereon. Once the (already cured) structural member 4 has been arranged on the inner face 3 of the fuselage 2, the honeycomb member 5 in the non-stiffened fresh state is placed on the upper reinforcing member 7 of the structural member 4, the entire assembly being subsequently cured. Therefore, the honeycomb member 5 provides the structural member 4 of the frame 1 with inertia, having been possible in a first step to easily arrange the structural member 4 on the inner face of the skin 3.

Another advantage of the design of the frame 1 of the invention lies on the fact that since the stringers 20 are omega-shaped, they can easily pass through the frames 1 as a result of the fact that they pass through the walls 40 of the structural member 4 of said frames 1, while at the same time said stringers 20 can be fixed by means of gluing to the walls 40, without needing to use rivets. To that end, the tolerances of said walls 40 must be narrow enough. The stringers 20 can be of a constant section or variable section.

As shown in FIG. 1, in some areas of the fuselage 2 of the aircraft it is necessary to make openings 50 such as passenger doors, cargo doors or windows. In this case, since the structure of the fuselage 2 is weakened, it is necessary to locally reinforce the area of the opening 50 with other members, such as reinforcing frames 51. The frames 1 of the invention, comprising the closed honeycomb member 5, are not used for the connection with the reinforcing members 52 of the necessary reinforcing frames 51 around the openings 50. As can be inferred from FIG. 1, the standard frames 60 are those which engage the reinforcing members 52 in the reinforcing frames 51, whereas the frames 1 of the invention can be all the other frames of the structure of the fuselage 2 of the aircraft.

Those modifications comprised within the scope defined by the following claims can be introduced in the preferred embodiments described above.

The invention claimed is:

1. A reinforcing frame (1) of the fuselage (2) of an aircraft, said fuselage (2) comprising a skin (3) and stringers (20), characterized in that it comprises a structural member (4) and a closed, internally hollow honeycomb member (5), the structural member (4) comprising a lower base (6) which is arranged on the inner face of the skin (3) of the fuselage (2), and through which the stringers (20) connecting the frames (1) to the rest of the structure of the fuselage (2) pass, and upper reinforcing members (7) on which the mentioned honeycomb members (5) are arranged, such that the honeycomb members (5) increase the inertia and the stiffness of the frame (1) without adding weight thereto, the frame (1) having high stiffness in the transverse direction, in addition to being intrinsically stable against local buckling.

2. The reinforcing frame (1) of the fuselage (2) of an aircraft according to claim 1, wherein the closed honeycomb member (5) is connected in a fresh, uncured state to the upper reinforcing member (7) of the structural member (4) once said structural member (4) has been placed on the inner face of the skin (3), the assembly formed by the structural member (4), the honeycomb member (5) and the skin (3) subsequently being cured.

3. The reinforcing frame (1) of the fuselage (2) of an aircraft according to claim 1, wherein the stringers (20) pass through walls (40) of the structural member (4) of the frame (1) arranged for such purpose, being connected to said frame (1) by means of gluing to the mentioned walls (40).

4. The reinforcing frame (1) of the fuselage (2) of an aircraft according to claim 3, wherein the tolerances of the walls (40) of the structural member (4) through which the stringers (20) pass are narrow.

5. The reinforcing frame (1) of the fuselage (2) of an aircraft according to claim 1, wherein the stringers (20) are of a variable section.

6. The reinforcing frame (1) of the fuselage (2) of an aircraft according to claim 1, wherein the stringers (20) are of a constant section.

7. The reinforcing frame (1) of the fuselage (2) of an aircraft according to claim 1, wherein the side walls (10) of the honeycomb members (5) comprise carbon fiber reinforcement layers increasing the stiffness of the frame (1).

8. The reinforcing frame (1) of the fuselage (2) of an aircraft according to claim 1, wherein the structural member (4) is made in composite material.

9. The reinforcing frame (1) of the fuselage (2) of an aircraft according to claim 1, wherein the honeycomb member (5) is made in composite material.

10. The reinforcing frame (1) of the fuselage (2) of an aircraft according to claim 1, wherein the structural member (4) is metallic.

11. The reinforcing frame (1) of the fuselage (2) of an aircraft according to claim 1, wherein the honeycomb member (5) is metallic.

12. The reinforcing frame (1) of the fuselage (2) of an aircraft according to claim 1, wherein the structural member (4) has an H beam section.

\* \* \* \* \*